UNITED STATES PATENT OFFICE.

AUGUST ROMMEL, OF GARSSEN, NEAR CELLE, GERMANY.

ARTIFICIAL-STONE COMPOSITION FOR BUILDING AND LIKE PURPOSES.

1,083,142.  Specification of Letters Patent.  Patented Dec. 30, 1913.

No Drawing.  Application filed October 20, 1911.  Serial No. 655,760.

*To all whom it may concern:*

Be it known that I, AUGUST ROMMEL, a subject of the German Emperor, residing at Garssen, near Celle, in Germany, have invented a certain new and useful Improvement in Artificial-Stone Compositions for Building and like Purposes, of which the following is a specification.

The object of this invention is to provide an improved weather and acid proof composition for building and like purposes, cheap to manufacture, durable, impermeable by water, and a bad conductor of heat.

The invention provides a composition which is, by reason of the qualities enumerated, highly suitable for the construction of cellars, refrigerating rooms, acid tanks and other purposes.

The mass may be made into bricks or be used in a plastic state. In the latter state it may be used for filling crevices and for producing the composition the following ingredients are used, but the proportions here stated may be varied within limits:—550 parts fossil tar or asphalt; 250 parts magnesia; 75 parts leather meal (ground leather-waste); 75 parts oil of resin; 50 parts water glass; 20 parts concentrated solution of alum; 2500 parts washed and baked sand. The magnesia and the alum solution are separately mixed, and also the leather meal and the water glass solution. The two mixtures thus produced are mixed with the hot sand, and the whole is then kneaded up, while hot, with the resin oil and the asphalt. While hot, the mass is of a viscous or pasty consistency, and should be thoroughly stirred, preferably by means of a mechanical stirrer, to insure homogeneous composition. The mass may be formed or pressed into bricks, blocks or the like, the molding and pressing being preferably performed while the mass is still hot. The bricks can be used at once, and do not require a lengthy period for hardening, as is usual with artificial stone compositions.

The ingredients used are such as are cheaply obtainable in abundant quantities in nearly all localities. The proportions stated in this specification are those which I find most suitable for common purposes.

What I claim as my invention and desire to secure by Letters Patent of the United States is:—

The process of producing a composition of matter for the purpose set forth by compounding, with 2500 parts of hot sand, a mixture of 250 parts of magnesia and 20 parts of concentrated alum solution and a mixture of 75 parts of ground leather and 50 parts of water glass, and mixing the compound with 550 parts of asphalt and 75 parts of oil of resin.

In witness whereof I have signed this specification in the presence of two witnesses.

AUGUST ROMMEL.

Witnesses:
 CARL CHROIEGER,
 FRIEDRICH EHLEN.